United States Patent
Ibryam

(10) Patent No.: US 11,018,965 B1
(45) Date of Patent: May 25, 2021

(54) SERVERLESS FUNCTION SCALING

(71) Applicant: Red Hat, Inc., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/752,186

(22) Filed: Jan. 24, 2020

(51) Int. Cl.
H04L 12/26 (2006.01)
H04L 29/08 (2006.01)

(52) U.S. Cl.
CPC .............. H04L 43/08 (2013.01); H04L 67/10 (2013.01)

(58) Field of Classification Search
CPC . H04L 43/08; H04L 43/0852; H04L 43/0864; H04L 43/0888; H04L 67/10; G06F 9/46
See application file for complete search history.

(56) References Cited

U.S. PATENT DOCUMENTS

| | | | |
|---|---|---|---|
| 8,423,619 B2 | 4/2013 | Hawkins et al. | |
| 9,998,418 B2 | 6/2018 | Clark et al. | |
| 10,361,985 B1* | 7/2019 | Shveykin | H04L 67/2842 |
| 10,382,380 B1* | 8/2019 | Suzani | H04L 51/30 |
| 10,454,795 B1* | 10/2019 | Jonsson | H04L 65/605 |
| 10,469,563 B2* | 11/2019 | Levy-Abegnoli | H04L 45/44 |
| 10,635,789 B1* | 4/2020 | Golden | H04L 67/16 |
| 10,732,962 B1* | 8/2020 | Florescu | G06F 11/0751 |
| 10,769,058 B1* | 9/2020 | Khandelwal | G06F 11/3688 |
| 10,887,427 B1* | 1/2021 | Adnan | H04L 67/42 |
| 2018/0262431 A1* | 9/2018 | Zhang | H04L 47/125 |
| 2019/0050258 A1* | 2/2019 | Kim | G06F 9/5011 |
| 2019/0250949 A1* | 8/2019 | Chen | H04L 41/082 |
| 2019/0312899 A1* | 10/2019 | Shulman | H04L 63/1416 |
| 2019/0317808 A1* | 10/2019 | Srinivasan | H04L 67/10 |
| 2019/0373521 A1* | 12/2019 | Crawford | H04L 67/10 |
| 2020/0007388 A1* | 1/2020 | Johnston | H04L 45/306 |
| 2020/0057677 A1* | 2/2020 | Ritter | H04L 43/08 |
| 2020/0127908 A1* | 4/2020 | Ribenzaft | H04L 67/1095 |

(Continued)

FOREIGN PATENT DOCUMENTS

| | | | |
|---|---|---|---|
| CN | 108595282 A | 9/2018 | |
| CN | 109885410 A | 6/2019 | |

(Continued)

OTHER PUBLICATIONS

WSO2; "WSO2 Message Broker"; Version 3.2.0; WSO2 Inc. Copyright ©2019; Accessed Date: Oct. 1, 2019; https://wso2.com/products/message-broker/—5 Pages.

(Continued)

Primary Examiner — Kostas J Katsikis
(74) Attorney, Agent, or Firm — K&L Gates LLP

(57) ABSTRACT

The present disclosure provides for systems and methods for dynamically managing a concurrency limit of a serverless function, in other words, a quantity of instances of a serverless function that may be concurrently executed. Performance metrics of the serverless function as it is implemented by services may be measured and compared against preconfigured thresholds. If the performance metrics meet the preconfigured thresholds, the concurrency limit of the serverless function may be increased. In some aspects, if one or more performance metrics fails to meet a respective preconfigured threshold, the concurrency limit of the serverless function may be decreased.

20 Claims, 5 Drawing Sheets

(56) References Cited

U.S. PATENT DOCUMENTS

| | | | | |
|---|---|---|---|---|
| 2020/0145300 | A1* | 5/2020 | Park | H04L 41/12 |
| 2020/0241999 | A1* | 7/2020 | Guim Bernat | G06F 11/3419 |
| 2020/0349067 | A1* | 11/2020 | Syamala | G06F 16/172 |
| 2020/0358719 | A1* | 11/2020 | Mestery | H04L 47/822 |
| 2020/0389401 | A1* | 12/2020 | Enguehard | H04L 45/3065 |
| 2020/0389516 | A1* | 12/2020 | Parekh | G06F 9/44505 |

FOREIGN PATENT DOCUMENTS

| | | | | |
|---|---|---|---|---|
| KR | 101037818 B1 | 5/2011 | | |
| WO | WO-2019128669 A1 * | 7/2019 | | G06F 9/4843 |
| WO | WO-2020124459 A1 * | 6/2020 | | H04L 29/06 |

OTHER PUBLICATIONS

"Better Performance Through Threading"; @AndroidDev on Twitter; Accessed Date: Oct. 1, 2019; https://developer.android.com/topic/performance/threads—7 Pages.

Juergen Hoeller; "Class SimpleMessageListenerContainer"; Spring Framework; Accessed Date: Jan. 24, 2020; https://docs.spring.io/spring/docs/current/javadoc-api/org/springframework/jms/listener/SimpleMessageListenerContainer.html#setConcurrentConsumers-int-—11 Pages.

Juergen Hoeller; "Class DefaultMessageListenerContainer" Spring Framework; Accessed Date: Jan. 24, 2020 https://docs.spring.io/spring/docs/current/javadoc-api/org/springframework/jms/listener/DefaultMessageListenerContainer.html#setConcurrency-java.lang.String-.

Eran Landau, William Thurston, Tim Bozarth; "Performance Under Load"; Netflix Technology Blog—Adaptive Concurrency Limits @ Netflix; Mar. 23, 2018; 8 Pages.

Jinspired; "JXInsight/OpenCore 6.4.EA.1 Released—Adaptive "Throughput" Control"; Oct. 3, 2012; 3 Pages.

Jinspired; "JXInsight/OpenCore 6.4.EA.2 Released—Adaptive "Response (Time)" Control"; Oct. 9, 2012; 1 Page.

Richard van Heest; "Feedback Control for Hackers"; Accessed Date Jan. 24, 2020; http://rvanheest.github.io/Literature-Study-Feedback-Control/Conclusion.html—2 Pages.

* cited by examiner

SERVERLESS FUNCTION SCALING

BACKGROUND

Serverless computing is a cloud-computing execution model in which a cloud provider runs a server, and dynamically manages the allocation of machine resources needed to execute a particular piece of code. The particular piece of code, typically called a function, is generally designed to have no dependencies on any other code and can accordingly be deployed and executed wherever and whenever it is needed. A function is event-driven, and thus its code is invoked only when triggered by a request. Multiple functions may be connected together or can serve as components of a larger application by interacting with code running in containers or on conventional servers.

SUMMARY

The present disclosure provides new and innovative systems and methods for dynamically managing scaling of a serverless function. In an example, a system includes a processor in communication with a memory. The processor is configured to set a first concurrency limit for a first serverless function of a plurality of serverless functions. The processor is also configured to measure one or more performance metrics of the first serverless function while implementing one or more instances of the first serverless function with one or more services in accordance with the first concurrency limit. Additionally, the processor is configured to determine whether each of the one or more performance metrics meets a respective predetermined threshold, and increase the first concurrency limit to a second concurrency limit in response to determining that each of the one or more performance metrics meets the respective predetermined threshold.

In an example, a method includes setting a first concurrency limit for a first serverless function of a plurality of serverless functions. The method also includes measuring one or more performance metrics of the first serverless function while implementing one or more instances of the first serverless function with one or more services in accordance with the first concurrency limit. Additionally, the method includes determining whether each of the one or more performance metrics meets a respective predetermined threshold, and increasing the first concurrency limit to a second concurrency limit in response to determining that each of the one or more performance metrics meets the respective predetermined threshold.

In an example, a non-transitory, computer-readable medium stores instructions. The instructions, when performed by a processor, cause the processor to set a first concurrency limit for a first serverless function of a plurality of serverless functions. The instructions also cause the processor to measure one or more performance metrics of the first serverless function while implementing one or more instances of the first serverless function with one or more services in accordance with the first concurrency limit. Additionally, the instructions cause the processor to determine whether each of the one or more performance metrics meets a respective predetermined threshold, and to increase the first concurrency limit to a second concurrency limit in response to determining that each of the one or more performance metrics meets the respective predetermined threshold.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
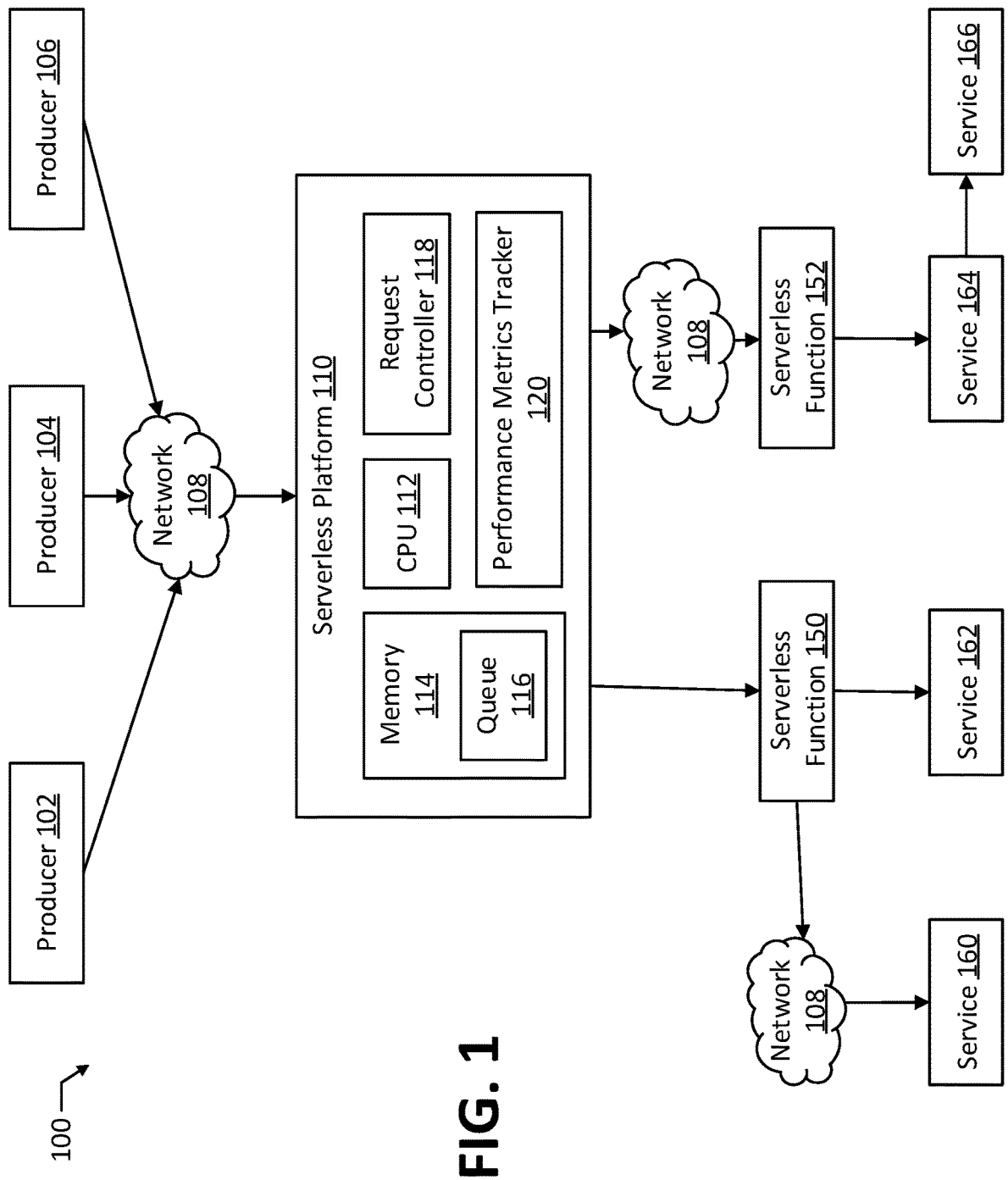
FIG. 1 shows a block diagram of an example system for processing requests in a serverless environment, according to an aspect of the present disclosure.

In a serverless computing architecture, individual pieces of code, typically called serverless functions, may be installed on a cloud-based serverless platform. The serverless platform may then execute any one or more of the individual serverless functions with one or more platform services upon a request initiating an individual serverless function. For example, a serverless function may be initiated by an image being uploaded to a database. The serverless platform may then execute the serverless function which requires applying a filter to the uploaded image using an image processing application. A serverless function may only execute a single request at a time; however, in some instances, many requests, e.g., 100, may be made near simultaneously with one another. One way a serverless function may be coded is such that a serverless platform may repeatedly execute the serverless function for each request. However, such serverless functions result in a prohibitively low processing speed for a serverless platform to be a viable computing option for large-scale applications. For instance, the serverless platform would have a prohibitively low throughput and prohibitively high latency given the time it would take for the serverless platform to process requests one by one.

Serverless functions may also be coded such that they may horizontally scale. In other words, to accommodate simultaneous requests, a serverless platform may scale a serverless function by concurrently executing numerous copies, or instances, of the serverless function, e.g., 100 or more, to concurrently process all of the simultaneous requests. If demand for the serverless function then drops, e.g., from 100 requests to 2, the serverless platform may delete the unneeded instances of the serverless function, thus scaling down the serverless function. In some instances, however, a large increase in requests may cause a serverless function to scale to a quantity of instances that causes problems for the serverless platform and/or the services implementing the serverless function. For example, a service that implements a serverless function may depend on APIs or databases with rate or connection limits that, if exceeded, may drastically increase the service's latency while processing requests, or may cause the service to fail to process requests, which in turn degrades the serverless platform's performance in executing the serverless function. In another example, one or more serverless functions may scale to a quantity of instances that uses a portion of the serverless platform's processing power or memory which causes the serverless platform's throughput to decrease and/or latency to increase to undesirable levels.

Most scale-related problems are the result of limits on infrastructure resources and time. For instance, while cloud-based, a serverless platform may rely on services that are on-premises and thus have computing capabilities that may more likely reach a saturation level than cloud-based services. This is because on-premises services run on physical, on-site servers that must be managed and maintained individually, whereas cloud-based services run on virtual servers hosted through cloud computing that may increase their computing capabilities virtually infinitely. Thus, a serverless platform that relies, at least in part, on services run on on-premises servers with finite computing capabilities cannot infinitely scale a serverless function because this would cause one or more of the services to stall once a server is utilized to its maximum computing capabilities. If one or more services were to stall, this would create a bottleneck for the serverless platform and would slow down the serverless platform's performance.

One way to manage increasing scale of serverless functions is to set a fixed maximum quantity of instances of a serverless function, a concurrency limit, that a serverless platform will execute concurrently. Determining an optimal concurrency limit, however, can be difficult and typically requires gradually resetting and increasing the concurrency limit, and may involve determining whether the services implementing the serverless function can process without stalling at the processing levels required for the increased concurrency limit, until an optimal quantity is determined. For instance, not all serverless functions scale the same way, and not all requests require the same output. For example, whether the result of a serverless function is returned to the requester or is only directed elsewhere can affect how a serverless platform may optimally manage increasing scale of serverless functions. Additionally, the optimal concurrency limit does not remain consistent. For instance, the optimal concurrency limit may be dependent on downstream services that are called by a service implementing a serverless function, and such downstream services' performance may vary due to being called by other services implementing other serverless functions. Therefore, a fixed concurrency limit may often lead to a serverless platform oversaturating one or more on-premises servers with service requests from instances of a respective serverless function. Or, a fixed concurrency limit may lead to a serverless platform underutilizing on-premises servers by executing too few instances of the respective serverless function concurrently.

Accordingly, the present disclosure provides for a system and method that enhances a serverless platform's ability to manage increasing scale of serverless functions by basing a concurrency limit for each respective serverless function on the respective function's performance metrics. For example, a serverless platform may receive 100 requests for a serverless function that has a concurrency limit of 50 instances. Thus, the serverless function may scale to 50 instances to concurrently execute 50 of the requests. The serverless platform may measure various performance metrics of the serverless function during the execution of the requests, or at the end of that time, and may increase the serverless function's concurrency limit if the serverless function's performance metrics meet a preconfigured threshold (e.g., a desired throughput and latency of messages coming to the function). Conversely, the serverless platform may decrease the serverless function's concurrency limit if the serverless function's performance metrics degrade and fail to meet a preconfigured threshold. At some subsequent time, if the serverless function's performance metrics do not further degrade, the serverless platform may then attempt to increase the serverless function's concurrency limit again and measure the response performance metrics.

By dynamically setting a concurrency limit for a serverless function based on the serverless function's performance metrics, a serverless platform may more efficiently execute requests that call for the serverless function by adapting to conditions that affect the serverless function's ability to scale. For instance, a serverless function may be considered as a logical wrapper around custom logic and/or service calls. Thus, by measuring the serverless function's performance metrics, the serverless platform may indirectly measure the performance of the downstream services that the serverless function calls as well. For example, at one point in time, an on-premises downstream service called on by a serverless function may have a high memory usage and is processing messages slowly. Thus, it may take longer for the one or more instances of the serverless function to execute requests, therefore decreasing the throughput of requests going to the serverless function and increasing the latency of the serverless function instances completing requests. If the throughput and/or latency of the serverless function degrade to a level that fails to meet a respective preconfigured threshold, the serverless platform may decrease a concurrency limit for the serverless function so that less messages are sent to the on-premises downstream service to help prevent the service from stalling out. At a subsequent time, however, the on-premises downstream service may no longer be utilized as highly and thus may be able to handle a greater quantity of concurrent messages from the serverless function. The serverless platform may therefore increase the serverless function's concurrency limit. Accordingly, the presently disclosed system makes it less likely that a serverless platform will oversaturate a server running a service with messages from a scaled serverless function, or execute a serverless function with too few instances.

FIG. 1 shows a block diagram of an example system for processing requests in a serverless environment, according to an aspect of the present disclosure. The example system 100 may include a set of producers 102, 104, 106 that issue requests to a serverless platform 110. In other examples, the components of the serverless platform 110 may be combined, rearranged, removed, or provided on a separate device or server. For instance, the producers 102, 104, and 106 may transmit the requests over a network 108 to the serverless platform 110. The network 108 can include, for example, the Internet or some other data network, including, but not limited to, any suitable wide area network or local area network. The serverless platform 110 may store the received requests in a queue 116 in its memory 114. The example serverless platform 110 may also include a processor in communication with the memory 114. The processor may be a CPU 162 or any other similar device.

The example serverless platform 110 may also include a request controller 118 programmed to execute a respective serverless function 150, 152 corresponding to a respective received request that initiates the respective serverless function 150, 152. The request controller 118 may be implemented by software executed by the CPU 112. For example, a first request (e.g., an image upload) may initiate the serverless function 150 and a second, different request (e.g., a website link being activated) may initiate the serverless function 152. In some instances, a serverless function 150 may be loaded into the serverless platform 110 itself. In other instances, the serverless platform 110 may access a serverless function 152 loaded into a different computing system over the network 108. Each of the respective serverless functions 150, 152 may scale such that more than one instance of the respective serverless function 150, 152 is executed concurrently.

Each serverless function 150, 152 may call one or more services that implement one or more instances of the respective serverless function 150, 152. A service may be software implemented by a processor. In some instances, a service may be cloud-based. In other instances, a service may be on-premises. A cloud-based service runs on a virtual server hosted through cloud computing, whereas an on-premises service runs on physical, on-site servers that must be managed and maintained individually. For example, the serverless function 150 may call a cloud-based service 160 over the network 108, and may call the on-premises service 162. In some instances, a service called by a serverless function 150, 152 may call another service downstream. For example, the serverless function 152 may call the on-premises service 164, which calls the on-premises service 166. The example serverless platform 110 may also include a performance metrics tracker 120 programmed to measure performance metrics of each respective serverless function 150, 152. For example, the system performance metrics may be throughput and/or latency/processing time, in some instances. The performance metrics tracker 120 may be implemented by software executed by the CPU 112.

Figure 2A:
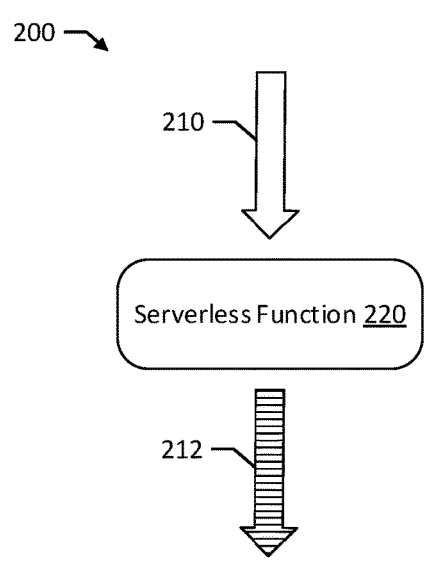
FIGS. 2A, 2B, and 2C illustrate example methods for a serverless function to scale.
Figure 2B:
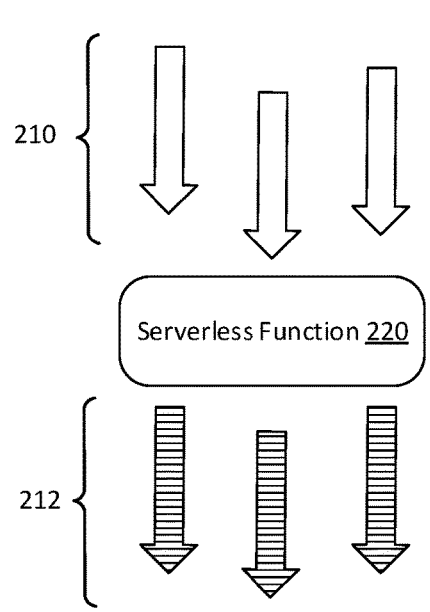
Figure 2C:
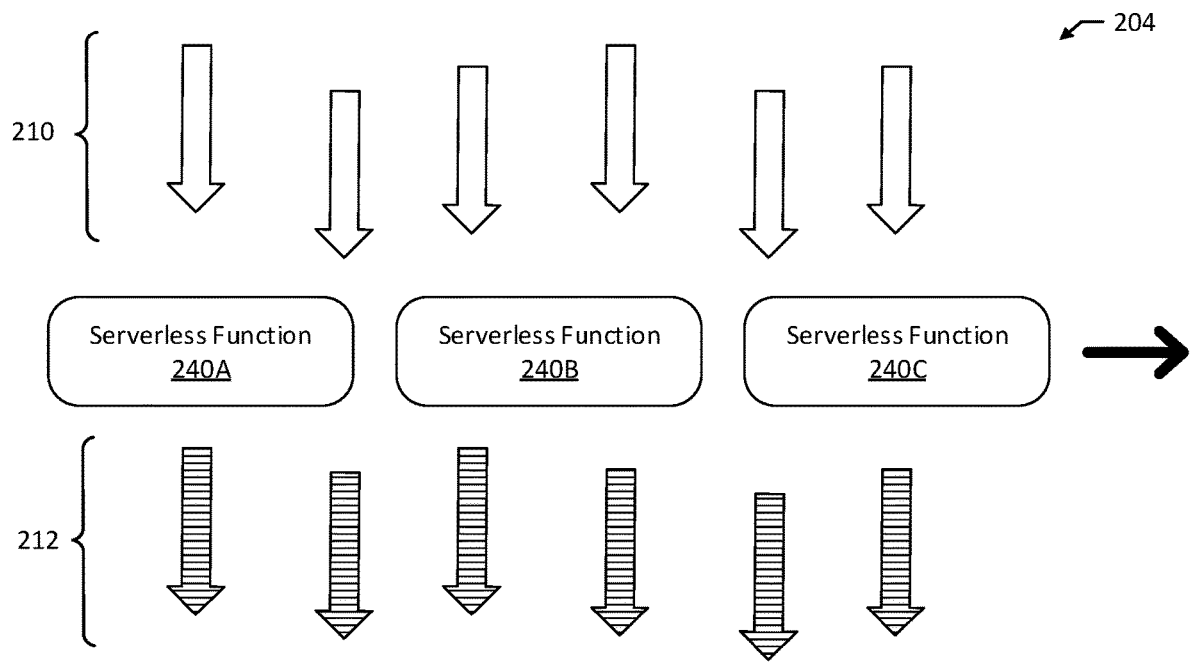

FIGS. 2A, 2B, and 2C illustrate how a serverless function may scale. For example, FIG. 2A illustrates an example method 200 that shows a serverless function 220 may take a single input 210 and produce a single output 212. FIG. 2B illustrates an example method 202 that shows that the serverless function 220 may be repeatedly executed for each of a plurality of inputs 210 to generate corresponding outputs 212. The serverless function 220 may still only take a single input 210 at a time to produce a single output 212, however, and thus the throughput of the serverless function 220 is lower than desired.

FIG. 2C shows an example method 204 that includes a serverless function 240A horizontally scaling. For example, the serverless function 240B is a second instance of the serverless function 240A and the serverless function 240C is a third instance of the serverless function 240A. As indicated by the arrow in FIG. 2C, in some examples, the quantity of instances of the serverless function 240A may increase further. The horizontal scaling of the serverless function 240A enables a serverless platform to concurrently process a set of inputs 210 rather than processing a single input 210 at a time since each serverless function instance 240A, 240B, and 240C may take an input 210 at the same time. Accordingly, the serverless function 240A may have a greater throughput than the serverless function 220. As discussed above, however, the serverless platform may need to manage the increasing scale of the serverless function 240A to maintain a desired performance of the serverless platform.

Figure 3:
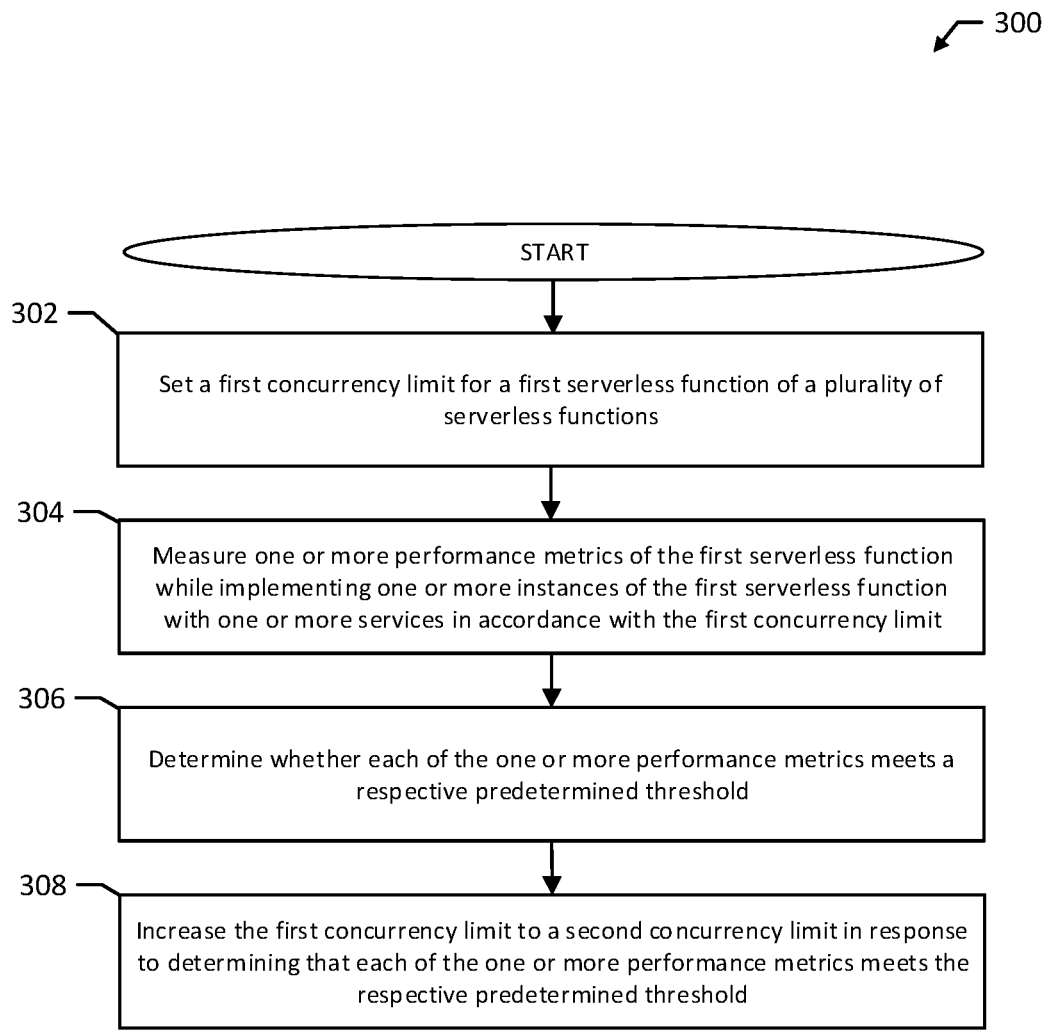
FIG. 3 shows a flowchart of an example method for managing a concurrency limit of a serverless function, according to an aspect of the present disclosure.

FIG. 3 shows a flowchart of an example method for managing a concurrency limit of a serverless function, according to an aspect of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes setting a first concurrency limit for a first serverless function of a plurality of serverless functions (block 302). For example, a concurrency limit may be a maximum quantity of concurrent instances of a serverless function that are executed simultaneously. In another example, a single instance of the first serverless function is capable of executing a single request and the first concurrency limit is a maximum quantity of instances of the first serverless function that are simultaneously executing a respective request of a plurality of requests. In another example, the first concurrency limit is a maximum quantity of respective instances of the first serverless function that are simultaneously implemented by one or more services. In another example, the first concurrency limit is a quantity of instances of the first serverless function that are executing at the same time. For example, the serverless platform 110 may set a first concurrency limit (e.g., 50 instances) for the serverless function 150.

The example method 300 may also include measuring one or more performance metrics of the first serverless function while implementing one or more instances of the first serverless function with one or more services in accordance with the first concurrency limit (block 304). In an example, the performance metrics tracker 120 may measure one or more performance metrics (e.g., throughput and latency) of the serverless function 150 while the request controller 118 implements one or more instances (e.g., 40) of the serverless function 150 in accordance with the first concurrency limit (e.g., 50). In another example, the request controller 118 may implement fifty instances of the serverless function 150, or any other quantity of instances less than or equal to fifty in order to be in accordance with the concurrency limit.

In some instances, the first serverless function (e.g., the serverless function 150) is implemented by the one or more services in response to an event occurring (e.g., an image or data upload). In some instances, a service may implement a respective serverless function by processing messages received as a result of the respective serverless function being initiated. For example, a service 160 may, in response to the producer 102 updating its social media status and triggering the serverless function 150, look up the friends list associated with the producer 102 in a database and transmit a status update notification to the friends on the list. In another example, a service 164 may process an image (e.g., resize) in response to the producer 104 uploading the image to a database and triggering the serverless function 152. In another example, a service may analyze a set of data, generate trend information, and store the trend information in response to the set of data being uploaded into a database and triggering a serverless function.

In some instances, the performance metrics tracker 120 may continuously measure the one or more performance metrics of the serverless function 150. In other instances, the performance metrics tracker 120 may measure the performance metrics each time a predetermined quantity of requests are executed (e.g., 2, 5, 10, 20, 50, 100). Additionally or alternatively, in such instances, the performance metrics tracker 120 may measure the performance metrics each time a predetermined amount of time elapses (e.g., every 5 seconds).

In some examples, the one or more performance metrics may include at least one of throughput, latency, and processing outcome. Throughput may include a rate at which requests are going to the serverless function 150. For example, throughput may be measured in bytes per second or requests per second. Latency may include an amount of time it takes for an instance of a serverless function 150 to acknowledge completing a request. For example, once a respective instance of the serverless function 150 completes a request, the respective instance may be executed again to complete another request from the queue 116 of the serverless platform 110. The latency of the serverless function 150 may be the time it takes for an instance to indicate that it may be executed again. For example, latency may be measured in average time (e.g., in milliseconds) to process a request or may be measured in average time (e.g., in milliseconds) to process a quantity of data (e.g., megabytes). In some examples, the performance metrics may include a processing outcome, such as whether the serverless function is successfully generating an outcome and/or an error rate of the serverless function. The error rate may include a rate at which the serverless function is failing to process requests with respect to time (e.g., one failed request per second).

The example method 300 may also include determining whether each of the one or more performance metrics meets a respective predetermined threshold (block 306). Each performance metric includes its own predetermined threshold. In an example, the performance metrics tracker 120 of the serverless platform 110 may determine whether each of the throughput and the latency of the serverless function 150 meet a respective predetermined threshold stored in the memory 114 of the serverless platform 110. For example, the predetermined threshold for throughput may be 15 requests/second (req/s) and the predetermined threshold for latency may be 75 milliseconds (ms). In various aspects of the present disclosure, the predetermined thresholds for the performance metrics may be programmed into the memory 114 of the serverless platform 110 upon manufacture. In some aspects, the predetermined thresholds are selected by a service provider at a time subsequent to manufacture. In some examples, the predetermined thresholds may be adjusted by the service provider at any time.

In various examples of the present disclosure, the predetermined threshold for throughput includes a specific rate at which a set of instances of the first serverless function are executing requests. For instance, the predetermined threshold for throughput may be 15 req/s as in the above example. Therefore, in such examples, the throughput performance metric of the serverless function 150 meets its respective predetermined threshold if the measured throughput equals or exceeds 15 req/s, for example, if the instances of the serverless function 150 are executing 20 req/s. Conversely, the throughput performance metric of the consumer 150 fails to meet its respective predetermined threshold if the measured throughput is below 15 req/s, for example, if the set of instances of the serverless function 150 are executing 13 req/s. In some instances, equaling the specific rate (e.g., 15 req/s) at which the instances of the serverless function 150 are executing requests may constitute failing to meet the predetermined threshold.

In various examples, the predetermined threshold for latency includes a specific length of time that it takes an instance of the serverless function 150 to acknowledge a completed request. For example, once a respective instance of the serverless function 150 completes a request, the respective instance may be executed again to complete another request from the queue 116 of the serverless platform 110. The predetermined threshold for latency of the serverless function 150 may be the time it takes for an instance to indicate that it may be executed again. For example, the predetermined threshold for latency may be 75 ms as in the above example. Therefore, in such examples, the latency performance metric of the serverless function 150 meets its respective predetermined threshold if the measured latency is equal to or below 75 ms, for example, if the latency is 60 ms. Conversely, the latency performance metric of the serverless function 150 fails to meet its respective predetermined threshold if the measured latency exceeds 75 ms, for example, if the latency is 77 ms. In some instances, equaling the predetermined threshold (e.g., 75 ms) may constitute failing to meet the predetermined threshold.

In some instances of the present disclosure, a predetermined threshold may be a previously measured performance metric, such as a measured performance metric prior to implementing the one or more instances of the first serverless function. For example, the measured performance metric may be the directly preceding measured performance metric prior to implementing the one or more instances of the first serverless function. In such instances, determining whether a respective performance metric meets its predetermined threshold includes comparing the measured respective performance metric after implementing the one or more instances of the first serverless function with a value of the performance metric that was measured prior to implementing the one or more instances of the first serverless function. In some aspects of the present disclosure, the predetermined threshold for a performance metric may be based on a set of measured values for the performance metric.

In some aspects of the present disclosure, a comparison metric is determined for a respective performance metric (e.g., throughput) and determining whether a respective performance metric meets its predetermined threshold includes comparing the respective performance metric to the comparison metric. The comparison metric (e.g., 25 req/s) may be determined by repeatedly measuring a respective performance metric for a predetermined time period (e.g., 2 minutes), or for a predetermined quantity of requests (e.g., 500) executed with the serverless function 150. From the repeatedly measured values, in some instances, the comparison metric may be determined by computing an average of the respective performance metric over the predetermined time or quantity of messages. In other instances, the comparison metric may be determined by identifying a maximum or minimum value of the respective performance metric over the predetermined time or quantity of messages. In other instances, other suitable calculation methods to determine a representative value of a range of values may be used. In an example, after determining the comparison metric, the serverless platform 100 may measure a throughput (e.g., 26 req/s) and compare it to the comparison metric (e.g., 25 req/s) to determine that the throughput of the serverless function meets the predetermined threshold.

The example method 300 may also include increasing the first concurrency limit to a second concurrency limit in response to determining that each of the one or more performance metrics meets the respective predetermined threshold (block 308). In an example, the performance metrics tracker 120 may measure a throughput (e.g., 17 req/s) and a latency (74 ms) of the serverless function 150, thus determining that both the throughput and latency meet their respective predetermined threshold (e.g., 15 req/s and 75 ms, respectively). In response, the request controller 118 may increase the first concurrency limit (e.g., 50) to a second concurrency limit (e.g., 55).

In some aspects of the present disclosure, the request controller 118 increases the first concurrency limit (e.g., 50) to a second concurrency limit in response to the quantity of instances of the serverless function 150 being equal to the first concurrency limit when the performance metrics tracker 120 determines that the performance metrics of the serverless function 150 meet their respective thresholds. In an example of such aspects, if there are forty instances of the serverless function 150 being executed when the performance metrics tracker 120 determines performance metrics that meet respective thresholds, the request controller 118 maintains the concurrency limit because the instances of the serverless function 150 are below the concurrency limit (e.g., 40 is less than 50). The request controller 118 may, however, create more instances (e.g., 10 more to reach 50) of the serverless function 150. If the performance metrics tracker 120 again determines performance metrics that meet respective thresholds when the quantity of instances of the serverless function 150 is equal to the first concurrency limit, then the request controller 118 may increase the first concurrency limit to a second concurrency limit (e.g., 55). Such aspects ensure that the services implementing the serverless function 150 can handle the quantity of instances in the concurrency limit before increasing the concurrency limit.

In some examples, the example method 300 may also include measuring the one or more performance metrics of the first serverless function while implementing one or more instances of the first serverless function with the one or more services in accordance with the second concurrency limit. In an example, the performance metrics tracker 120 may measure a throughput (e.g., 15 req/s) and latency (e.g., 85 ms) of the serverless function 150 while implementing one or more instances (e.g., 55) of the serverless function 150 with one or more services in accordance with the second concurrency limit (e.g., 55). The example method 300 may also include determining whether each of the one or more performance metrics meets the respective predetermined threshold. In the example, the performance metrics tracker 120 may determine that the measured throughput (e.g., 15 req/s) meets its respective threshold (e.g., 10 req/s), but that the measured latency (e.g., 90 ms) fails to meet its respective threshold (e.g., 80 ms).

The example method 300 may also include decreasing the second concurrency limit to a third concurrency limit in response to determining that at least one performance metric fails to meet the respective predetermined threshold. In the example, the request controller 118 may decrease the second concurrency limit (e.g., 55) to a third concurrency limit (e.g., 52). In some examples, the second concurrency limit (e.g., 55) may be decreased to a third concurrency limit that equals the first concurrency limit (e.g., 50), the concurrency limit that last resulted in each of throughput and latency meeting their respective predetermined thresholds. In other examples, the third concurrency limit (e.g., 47) may be less than the first concurrency limit (e.g., 50).

In other aspects, the concurrency limit may be decreased upon determining that more than one performance metric fails to meet its respective threshold. For example, in such aspects, the concurrency limit may be decreased if both throughput and latency fail to meet their respective thresholds, but not if only one does. In some aspects, the concurrency limit may be decreased in response to at least one performance metric failing to meet its respective predetermined threshold a single time. In other aspects, the concurrency limit may be decreased in response to the at least one performance metric failing to meets its respective predetermined threshold for a predetermined amount of time (e.g., seconds) or for a predetermined quantity of messages processed (e.g., 10). For example, the request controller 118 may decrease the concurrency limit of the serverless function 150 if the performance metrics tracker 120 measures a latency above its predetermined threshold for ten consecutive seconds, but not before. Thus, a performance metric that briefly fails to meets it respective threshold, but quickly rebounds, does not cause the concurrency limit to decrease. For example, for a latency threshold of 75 ms, the performance metrics tracker 120 measuring a latency of 73 ms, then of 76 ms for one second, and then of 74 ms, would not cause the request controller 118 to decrease the concurrency limit.

The respective predetermined thresholds for increasing the concurrency limit and decreasing the concurrency limit may be different such that they act as lower and upper bounds. For example, a measured throughput of 12 req/s may have a predetermined threshold of 15 req/s and of 10 req/s. The measured throughput in this example meets the lower bound threshold of 10 req/s, but it does not fail to meet the upper bound threshold of 15 req/s, it merely does not meet it. Thus, the request distributor 118 maintains the concurrency limit. If the measured throughput decreases to 9 req/s, then the measured throughput fails to meet the lower bound threshold of 10 req/s and the request distributor 118 may decrease the concurrency limit, in some examples. If, instead, the measured throughput increases to 16 req/s, then the measured throughput meets the upper bound threshold of 15 req/s and the request distributor 118 may increase the concurrency limit (e.g., if the other performance metrics meet their respective thresholds as well, in some examples).

The example method 300 may then include measuring the one or more performance metrics of the serverless function 150 while implementing one or more instances of the serverless function 150 with the one or more services in accordance with the third concurrency limit. In some aspects of the present disclosure, the example method 300 may include maintaining the third concurrency limit (e.g., 52) for a predetermined time period (e.g., minutes), or for a predetermined quantity of requests (e.g., 200) being executed. The predetermined time period or quantity of requests may begin after decreasing (e.g., immediately after) the second concurrency limit to the third concurrency limit. If each of the respective performance metrics meet their respective predetermined thresholds during the time period, or quantity of requests, then the example method 300 may include increasing the third concurrency limit (e.g., 52) to a fourth concurrency limit (e.g., 55) in response to the time period ending or the quantity of requests being executed. If instead at least one of the performance metrics fails to meet its respective predetermined threshold during the time period or the quantity of requests executed, then the example method 300 may include decreasing the concurrency limit. In some examples, the fourth concurrency limit may be equal to the second currency limit (e.g., 55), the directly preceding concurrency limit that had resulted in at least one performance metric failing to meet its predetermined threshold. In other examples, the fourth concurrency limit may be less than the second concurrency limit (e.g., 53) to attempt a lesser quantity of concurrent instances than the second concurrency limit which caused the performance metrics to degrade. In some examples, the fourth concurrency limit (e.g., 56) may be greater than the second concurrency limit.

By measuring a specific rate at which one or more instances of the serverless function 150 are executing requests, the throughput of the serverless function 150, the serverless platform 110 is able to indirectly gauge the performance of the services implementing the serverless function 150 without communicating with the services. For example, each instance of the first serverless function is able to execute a single request. Thus, if the serverless platform 110 has one hundred requests in its queue 116 for the serverless function 150, which has a concurrency limit of fifty instances, then fifty requests will remain in the queue 116 while fifty requests are concurrently executed respectively by fifty instances of the serverless function 150 that are implemented by one or more services 160, 162. As an instance of the serverless function 150 successfully completes a request, the instance of the serverless function 150 may execute another request from the queue 116. If the rate at which requests are leaving the queue 116 to be executed slows down, a decrease in throughput, this may be an indication that the services implementing the instances of the serverless function 150 are slowing down. And if the rate at which requests are leaving the queue 116 slows down to a predetermined threshold, this may be an indication that the services (e.g., the on-premises services) are, or are becoming, oversaturated with messages.

Accordingly, the request controller 118 of the serverless platform 110 may decrease the concurrency limit of the serverless function 150 so that less messages are sent to the services to reduce the likelihood that one or more of the services stall out. Conversely, if the throughput remains constant or increases, this may be an indication that the services are performing well, and potentially could process additional messages. In such a case, the request controller 118 may increase the concurrency limit of the serverless function. Accordingly the presently disclosed serverless platform 110 may increase the request processing efficiency of a serverless platform by allowing a serverless function to scale to maximize its throughput until a point where the performance metrics (e.g., throughput and latency) of the serverless function, and indirectly of the services implementing the function, degrade to fail to meet a threshold. At this point, the serverless platform may scale down the quantity of instances of the serverless function to help prevent the services implementing the function from stalling out.

As with throughput, by measuring the latency of the serverless function 150, the specific length of time that it takes an instance of the serverless function 150 to acknowledge a completed request, the serverless platform 110 is able to indirectly gauge the performance of the services implementing the serverless function 150 without communicating with the services. For example, if the latency increases, this may be an indication that the services implementing the instances of the serverless function 150 are slowing down. And, if the latency increases to meet a predetermined threshold, this may be an indication that the services are, or are becoming, oversaturated with messages. Conversely, if the latency remains constant or decreases, this may be an indication that the services are performing well, and potentially could process additional messages. Thus, the presently disclosed serverless platform 110 may increase the request processing efficiency of a serverless platform, as described above, by dynamically adjusting the concurrency limit of a serverless function based on its measured latency.

Figure 4:
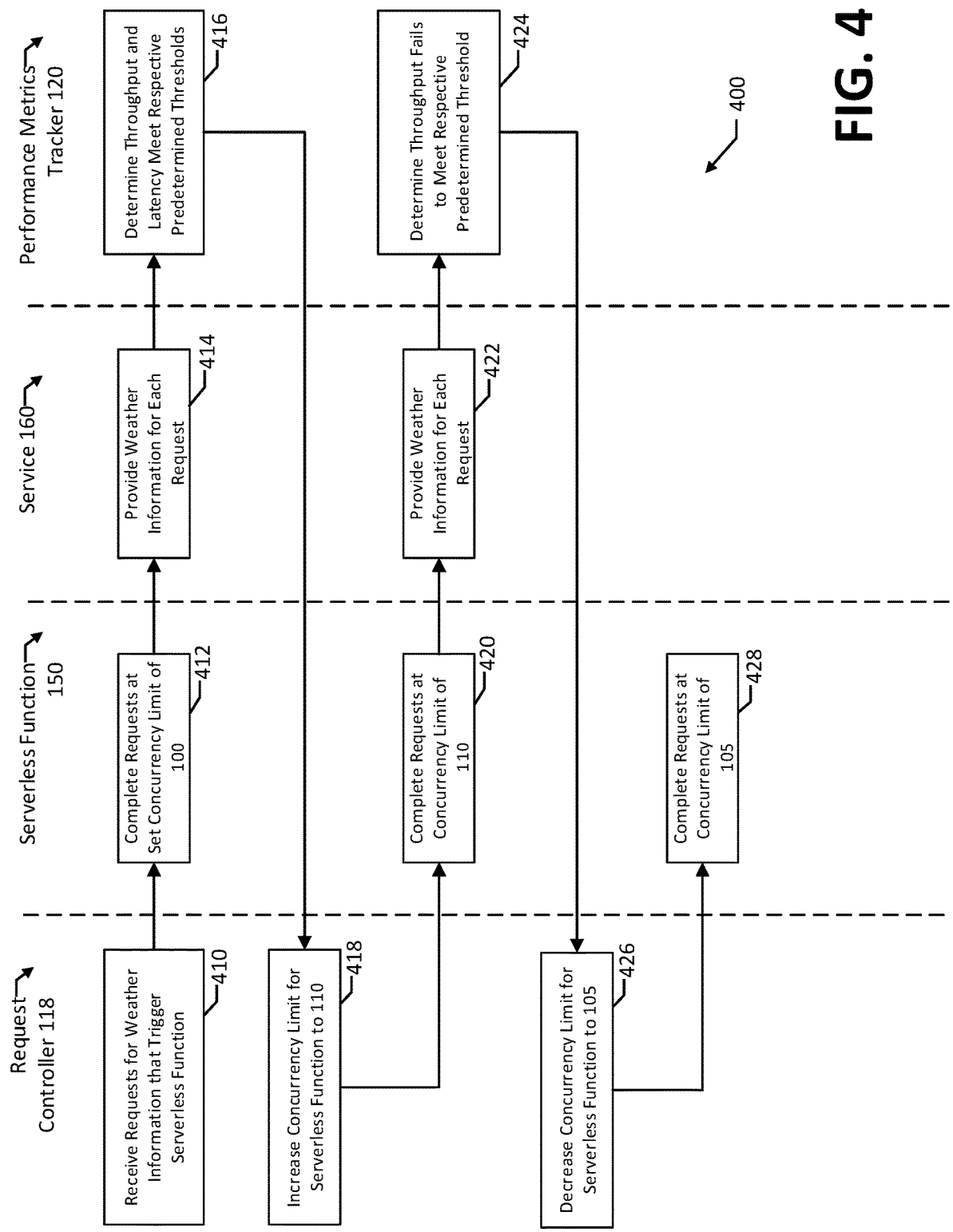
FIG. 4 shows a flow diagram of an example method for scaling a serverless function in a mobile application, according to an aspect of the present disclosure.

FIG. 4 shows a flow diagram of an example method 400 for scaling a serverless function in a mobile application, according to an aspect of the present disclosure. For example, the serverless function may be coded to update weather information for a mobile weather application. The serverless function may be hosted in a serverless platform. Users of the mobile weather application may open the application, or refresh the application, to initiate a request for updated weather information. Each request is an event that causes the weather application to make an API call to the serverless platform, which triggers the serverless function. The serverless function may be coded such that weather information is retrieved from a database and transmitted to the mobile weather application for display to the user. As there may be many users of the mobile weather application, there may be many requests for updated weather information made simultaneously, or near simultaneously, thus requiring many concurrent instances of the serverless function. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes the request controller 118 of the serverless platform receiving requests for weather information that trigger the serverless function 150 (block 410). For example, a user may open the mobile weather application, which makes an API call to the request controller 118, which then triggers the serverless function 150. In an example, the serverless platform may have 1,000 requests for updated weather information in its queue. The serverless platform then executes the serverless function 150 at a set concurrency limit of one hundred instances, and the serverless function 150 completes the requests at the set concurrency limit of one hundred instances (block 412). The instances of the serverless function 150 complete the requests by calling a service 160 to provide updated weather information (block 414). For example, the service 160 may retrieve weather information from a database and transmit the retrieved weather information to the mobile weather application.

The performance metrics tracker 120 of the serverless platform then determines that the throughput and latency of the serverless function 150 meet their respective predetermined thresholds (block 416). For example, the performance metrics tracker 120 determines that throughput and latency meet their respective thresholds after fifty requests are completed. In response, the request controller 118 increases the concurrency limit for the serverless function 150 to one hundred and ten instances (block 418). To do so, the request controller 118 may create ten additional instances of the serverless function 150. The serverless platform then executes the serverless function 150 at a set concurrency limit of one hundred and ten instances, and the serverless function 150 completes the requests at the set concurrency limit of one hundred and ten instances (block 420). The service 160 retrieves the weather information from a database and transmits the retrieved weather information to the mobile weather application (block 422).

The performance metrics tracker 120 then determines that the throughput of the serverless function 150 fails to meet the respective predetermined threshold (block 424). For instance, the throughput of the serverless function 150 decreased to fall below a lower bound threshold. In an example, the database that stores the weather information may have a set connection limit and the request traffic at the node where the database resides may be near or may have exceeded the connection limit such that the throughput of the service 160 in retrieving weather information from the database has slowed down. The slowed down throughput of the service 160 correspondingly slows down the throughput of the serverless function 150 to a level that fails to meet its predetermined threshold. In response, the request controller 118 decreases the concurrency limit for the serverless function 150 to one hundred and five instances (block 426). The decreased concurrent instances of the serverless function 150, and thus the decreased concurrent requests for weather information at the database from the service 160, may help prevent the service 160 and/or the database from stalling. In some examples, the request controller 118 may terminate the five instances of the serverless function 150 that are now in excess of the concurrency limit. In other examples, the five excess instances may remain unused. The serverless platform then executes the serverless function 150 at a set concurrency limit of one hundred and five instances and the serverless function 150 completes the requests at the set concurrency limit of one hundred and five instances (block 428).

Figure 5:
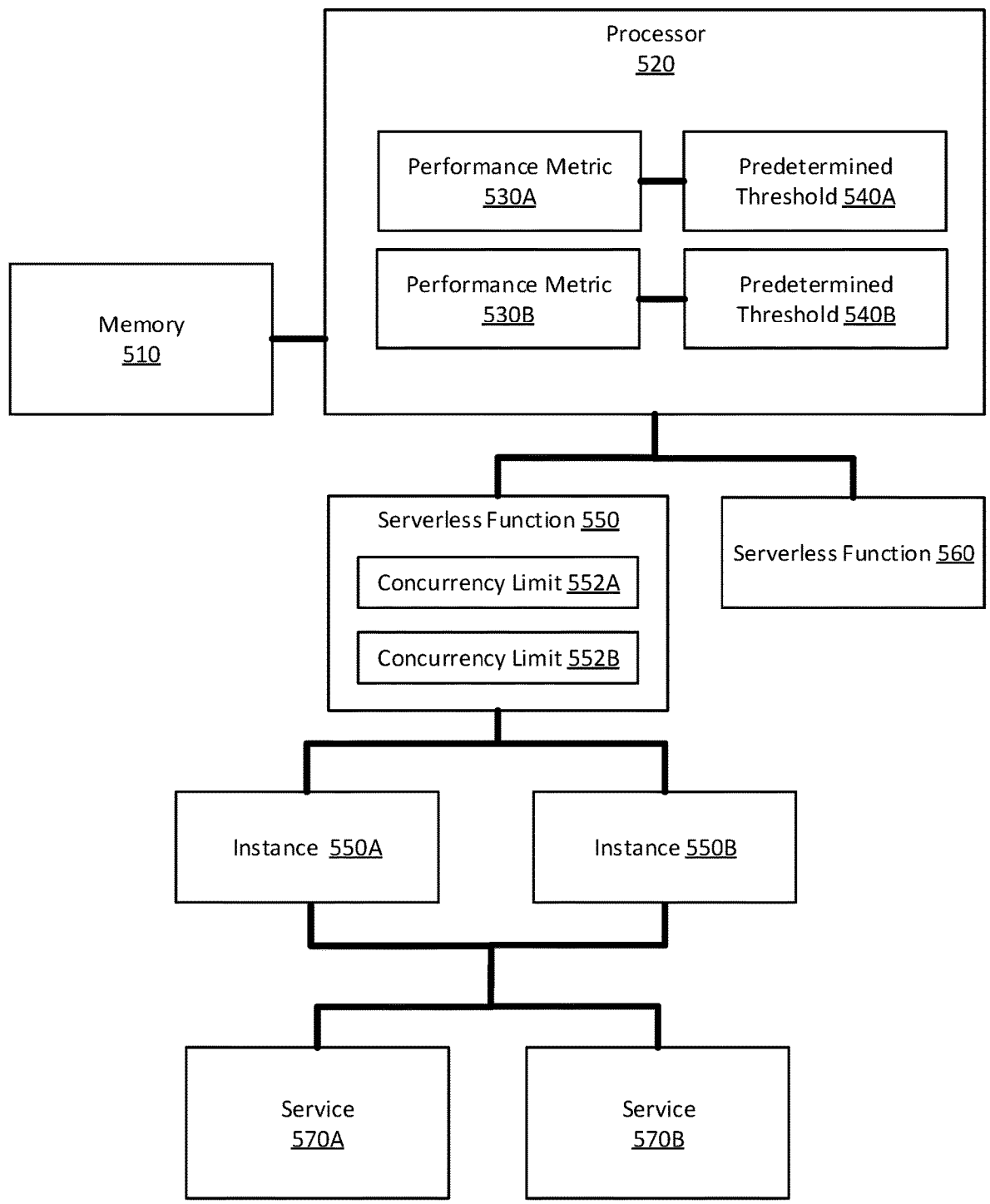
FIG. 5 shows a block diagram of an example system for adaptively scaling a serverless function, according to an aspect of the present disclosure.

FIG. 5 shows a block diagram of an example system for adaptively scaling a serverless function, according to an aspect of the present disclosure. The example system 500 includes a processor 520 in communication with a memory 510. The processor 520 is configured to set a concurrency limit 552A for a serverless function 550 of a plurality of serverless functions 550, 560. The processor 520 is also configured to measure a performance metric 530A and a performance metric 530B of the serverless function 550 while implementing the instance 550A and the instance 550B of the serverless function 550 with the service 570A and the service 570B. The processor 520 additionally determines whether the performance metric 530A meets a predetermined threshold 540A and whether the performance metric 530B meets a predetermined threshold 540B. The processor 520 is also configured to increase the concurrency limit 552A of the serverless function 550 to a concurrency limit 552B of the serverless function 550 in response to determining that the performance metric 530A meets the predetermined threshold 540A and that the performance metric 530B meets the predetermined threshold 540B.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, ASICs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A system comprising:
a memory; and
a processor, in communication with the memory, configured to:
set a first concurrency limit for a first serverless function of a plurality of serverless functions;
measure one or more performance metrics of the first serverless function while implementing one or more instances of the first serverless function with one or more services in accordance with the first concurrency limit;
determine whether each of the one or more performance metrics meets a respective predetermined threshold; and
increase the first concurrency limit to a second concurrency limit in response to determining that each of the one or more performance metrics meets the respective predetermined threshold.

2. The system of claim 1, wherein the first concurrency limit is a first quantity of concurrent instances of the first serverless function, the second concurrency limit is a second quantity of concurrent instances of the first serverless function, and the second quantity is greater than the first quantity.

3. The system of claim 1, wherein implementing the first serverless function with the one or more services includes the one or more services processing a plurality of messages.

4. The system of claim 1, wherein the one or more performance metrics include at least one of throughput and latency.

5. The system of claim 4, wherein the respective predetermined threshold for throughput is a rate at which the one or more instances of the first serverless function are executing requests.

6. The system of claim 4, wherein the respective predetermined threshold for latency is a length of time for an instance of the one or more instances of the first serverless function to acknowledge a request.

7. The system of claim 1, wherein the respective processor is further configured to:
measure the one or more performance metrics of the first serverless function while implementing one or more instances of the first serverless function with the one or more services in accordance with the second concurrency limit;
determine whether each of the one or more performance metrics meets the respective predetermined threshold;
decrease the second concurrency limit to a third concurrency limit in response to determining that at least one performance metric fails to meet the respective predetermined threshold; and
measure the one or more performance metrics of the first serverless function while implementing one or more instances of the first serverless function with the one or more services in accordance with the third concurrency limit.

8. The system of claim 7, wherein the third concurrency limit is equal to the first concurrency limit.

9. The system of claim 7, wherein the processor is configured to decrease the second concurrency limit to the third concurrency limit in response to determining that at least one performance metric fails to meet the respective predetermined threshold for a predetermined amount of time or a predetermined quantity of messages processed by the one or more services implementing the first serverless function.

10. The system of claim 7, wherein the processor is further configured to:
maintain the third concurrency limit for a predetermined time period, wherein the predetermined time period begins after decreasing the second concurrency limit to the third concurrency limit; and
increase the third concurrency limit to a fourth concurrency limit in response to the predetermined time period ending.

11. The system of claim 10, wherein the fourth concurrency limit is equal to or less than the second concurrency limit.

12. The system of claim 7, wherein the processor is further configured to:
maintain the third quantity of serverless functions for a predetermined quantity of requests executed after decreasing the second concurrency limit to the third concurrency limit; and
increase the third concurrency limit to a fourth concurrency limit in response to the predetermined quantity of requests being executed.

13. A method comprising:
setting a first concurrency limit for a first serverless function of a plurality of serverless functions;
measuring one or more performance metrics of the first serverless function while implementing one or more instances of the first serverless function with one or more services in accordance with the first concurrency limit;
determining whether each of the one or more performance metrics meets a respective predetermined threshold; and
increasing the first concurrency limit to a second concurrency limit in response to determining that each of the one or more performance metrics meets the respective predetermined threshold.

14. The method of claim 13, wherein the first serverless function is implemented with the one or more services in response to an event occurring.

15. The method of claim 13, further comprising continuously measuring the one or more performance metrics of the first serverless function.

16. The method of claim 13, further comprising measuring the one or more performance metrics at each occurrence of the one or more services processing a predetermined quantity of messages or at each occurrence of a predetermined time period elapsing.

17. The method of claim 13, further comprising determining a comparison metric for a respective performance metric,
wherein determining the comparison metric includes measuring the respective performance metric for a predetermined time period or for a predetermined quantity of messages processed by the one or more services, and
wherein determining whether a respective performance metric meets the respective predetermined threshold includes comparing the respective performance metric to the determined comparison metric.

18. The method of claim 13, wherein determining whether the respective performance metric meets the respective predetermined threshold includes comparing the respective performance metric at a time subsequent to the one or more services implementing the one or more instances of the first serverless function to the respective performance metric at a time preceding the one or more services implementing the one or more instances of the first serverless function.

19. A non-transitory, computer-readable medium storing instructions which, when performed by a processor, cause the processor to:
set a first concurrency limit for a first serverless function of a plurality of serverless functions;
measure one or more performance metrics of the first serverless function while implementing one or more instances of the first serverless function with one or more services in accordance with the first concurrency limit;
determine whether each of the one or more performance metrics meets a respective predetermined threshold; and
increase the first concurrency limit to a second concurrency limit in response to determining that each of the one or more performance metrics meets the respective predetermined threshold.

20. The non-transitory, computer-readable medium of claim 19, wherein at least one respective service of the one or more services is located on a computing system different than the remaining services of the one or more services.

* * * * *

UNITED STATES PATENT AND TRADEMARK OFFICE
CERTIFICATE OF CORRECTION

PATENT NO. : 11,018,965 B1
APPLICATION NO. : 16/752186
DATED : May 25, 2021
INVENTOR(S) : Ibryam Page 1 of 1

It is certified that error appears in the above-identified patent and that said Letters Patent is hereby corrected as shown below:

In the Claims

In Column 14, Line 50 (Claim 7), replace "the respective processor" with --the processor--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*